Sept. 7, 1965 A. F. MacLEAN 3,205,162
ELECTRIC DISCHARGE PROCESS AND APPARATUS
Filed Aug. 8, 1961 2 Sheets-Sheet 2
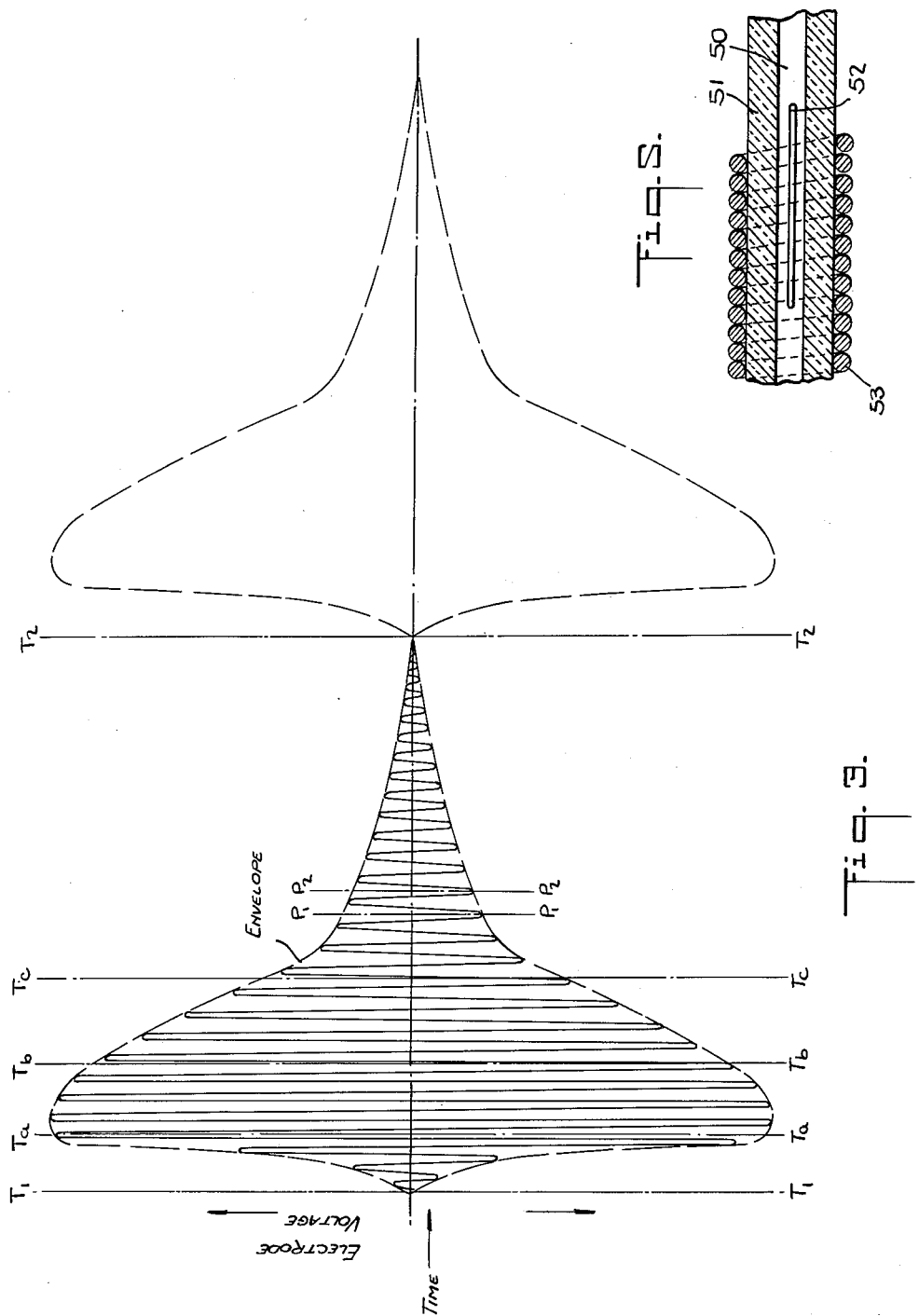

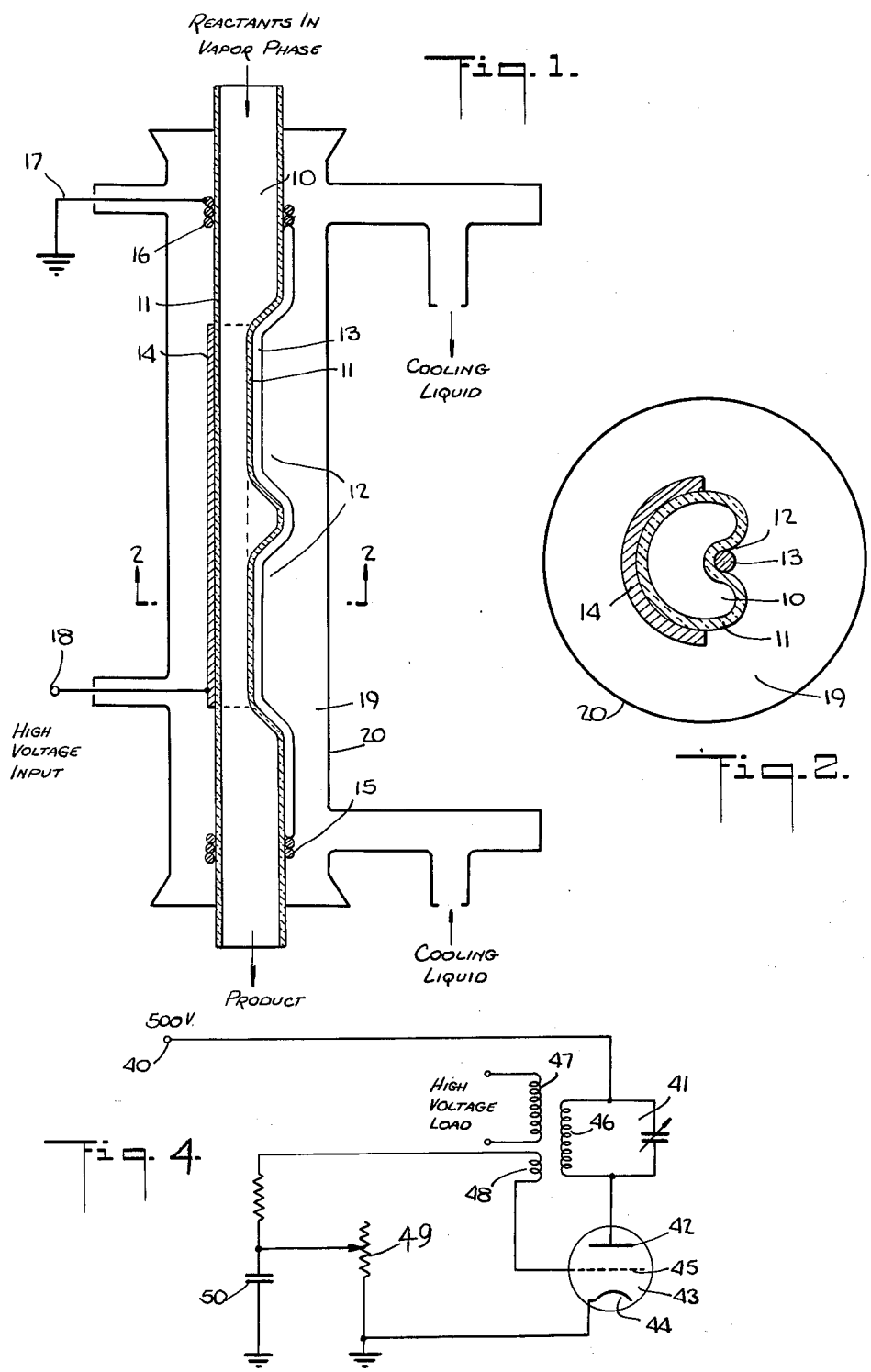

United States Patent Office 3,205,162
Patented Sept. 7, 1965

3,205,162
ELECTRIC DISCHARGE PROCESS AND APPARATUS
Alexander F. MacLean, Corpus Christi, Tex., assignor to Celanese Corporation of America, New York, N.Y., a corporation of Delaware
Filed Aug. 8, 1961, Ser. No. 130,112
3 Claims. (Cl. 204—312)

This invention relates to a process of conducting chemical reactions in a glow type electric discharge and to apparatus utilized in said process.

The process of producing or promoting chemical reactions to form desired end products by subjecting the reactants to the effect of the electrical discharge or glow discharge caused by alternating electric fields is well known in the art and is commonly known as volatilization. Conventionally, electric discharge reactions are conducted in a cell through which the reactants, usually in the vapor phase are passed. The cell contains a pair of spaced electrodes in the path of reactants. These electrodes are subjected to an alternating voltage to produce therebetween an alternating field resulting in the characteristic glow of the electric discharge system.

Existing electric discharge processes and apparatus may be classified into two groups: (1) lower frequency electric discharge processes employing alternating fields having frequencies below 5,000 cycles/sec. and usually about 60 cycles/second and (2) higher frequency electric discharge processes employing alternating fields having frequencies varying from 10,000 cycles/sec. to 600 megacycles/sec. and higher. The lower frequency processes require large and cumbersome reaction cells, employ apparatus having a very low power efficiency and give low product yields. On the other hand the higher frequency processes while giving improved yields require operation at subatmospheric pressures.

It is, accordingly, the primary object of this invention to provide a novel process and apparatus for electric discharge synthesis which will produce higher yields of reaction products.

It is another object of this invention to provide a novel process and apparatus for electric discharge synthesis which employs reaction cells greatly reduced in size from those used in conventional low frequency discharge processes.

It is another object of this invention to provide a novel process and apparatus for electric discharge synthesis which is operable at atmospheric and higher pressures.

Other objects and advantages of this invention will become apparent from the specification and claims which follow. All proportions given are by weight unless otherwise specified.

According to one aspect of this invention there is provided a novel process for electric discharge synthesis in which the reactants in the vapor phase and under atmospheric or higher pressure are subjected to an electric discharge produced by a pulsated alternating current. There is, further, provided improved electric discharge apparatus which is capable of producing a pulsated alternating current and consequently a pulsated alternating field. It has been found by comparison under identical conditions that the electric discharge process of this invention using pulsated alternating current will produce better product yields than will unpulsated alternating current of the same frequency.

With this novel process, it is now possible to obtain improved yields with electric discharge and further to conduct reactions heretofore considered impractical or not possible by electric discharge. Chemical reactions which may be advantageously conducted by use of this novel process include hydrogenation of organic compounds such as aliphatic hydrocarbons, e.g., alkanes such as butane, cyclohexanes and branched alkanes to yield lower alkanes; alkenes such as ethylene and cyclopentadiene to yield saturated hydrocarbons; aromatic hydrocarbons, e.g., xylene, naphthalene and benzene to yield, in general, cyclic hydrocarbons having less unsaturation; the addition of nitrogen to hydrocarbons including aliphatics such as methane, ethane, cyclohexane and cyclopropane and aromatics such as xylene, benzene, naphthalene and styrene; the production of ozone from oxygen; the decomposition of water to form hydrogen peroxide; the decomposition of ammonia to form hydrazine and the reaction of oxygen and hydrocarbons including alkanes such as methane, propane, cyclohexane, isobutane and neopentane, alkenes such as ethylene, propylene, butene-2 and cyclohexene; aromatics such as xylene, toluene, benzene and naphthalene to form peroxides, epoxides, carbonyl compounds and alcohols; forming atomic hydrogen from hydrogen gas and reacting ammonia, hydrocarbons and hydrogen to form amines. Another important use of the process of this invention is for the polymerization by free radical formation of hydrocarbons including methane, ethane, ethylene, and propylene. The electric discharge process of this invention induces the initiation of free radicals from which polymerization proceeds. For instance, in the polymerization of methane, the electric discharge reaction ruptures the $CH_3 \cdot H$ bond to produce the free methyl radical from which polymerization proceeds. The novel process of this invention may also be used with reactants in the liquid phase.

The present invention will be more readily understood by reference to the accompanying drawings in which
FIGURE 1 is a longitudinal section of one embodiment of a reaction cell.
FIGURE 2 is a cross section along lines 2—2' of FIGURE 1.
FIGURE 3 is a graph showing the pulsed alternating voltage applied to the reaction cell.
FIGURE 4 is a diagram of a circuit which will produce pulsated alternating current required in this invention.
FIGURE 5 is a longitudinal section of another embodiment of a reaction cell.

FIGURES 1 and 2 show one embodiment of the reaction cell used in this invention. The reactants are vaporized by conventional methods and fed into reaction cell chamber 10 wherein they are subjected to the electric discharge. Chamber 10 is enclosed by walls 11 preferably made of heat resistant glass such as Pyrex. While chamber 10 may be cylindrical, it is advantageous to have one or more concavities 12 in the walls 11 in order to narrow the space between the walls in certain areas to bring electrodes 13 and 14 closer together. Electrode 13 is a longitudinally running wire contacting the outside of the depressed upper wall portion of the chamber. Wire 13 is affixed to the outer wall by coils 15 and 16 and is coupled to ground 17. Electrode 14 which may also be a wire is advantageously a semicylindrical longitudinal plate contacting the outside of the chamber wall directly opposite electrode 13. Electrode 14 is coupled to voltage input 18. Jacket 20 encloses chamber 19 through which a cooling liquid is passed. A pulsated alternating voltage is applied across input 18 and ground creating a pulsed alternating field in chamber which subjects the reactant gases to the electric or glow discharge.

The conditions and nature of apparatus used in the general process of this invention may vary considerably depending on the nature of the reactants and the desired products. Accordingly, the proportions of the reactants, the operating temperatures, the reaction cell design and the electric current characteristics may be varied. Reaction temperatures are preferably in the general range of from −150° to 600° C. Within this general range, the temperature ranges which produce the best results will vary with the reactants, e.g., in producing hydrazine, peroxides and epoxides, the preferred range is from −50° to 100° C. and when producing polymers and nitriles, a range of from 100° C. to 400° C. is preferred. Reaction pressures may vary from 1 to 40 atmospheres preferably from 1 to 10 atmospheres. With respect to vessel design and proportions, where for example ozone is being synthesised from free oxygen, a reaction cell having concavities similar to that in FIGURE 1 is used with the inner surfaces of the portions of the walls to which the electrodes are attached preferably being at least 1 mm. and no more than 10 mm. apart. In many cases, a cell in which the electric discharge takes place between two separated insulated surfaces, as in the case of the described cell is preferable. However, the cell design may be varied in order to achieve best results with varied reactants. In other cases, it is advantageous to employ a cell such as that of FIGURE 5, in which the discharge occurs between an uninsulated surface and an insulated surface.

With respect to voltage and current characteristics, the nature of the pulsed alternating voltage will here be described. Referring to FIGURE 3 which is a graph showing suitable pulsated alternating voltage which may be utilized in the process of this invention, the time length from $T_1$ to $T_2$ is the period for one pulse. The voltage used is preferably an alternating voltage in the form of a sine wave having a constant frequency since this is most easily generated. However, the alternating voltage may be in the form of other waves having a constant frequency, e.g., a square wave. The period of this sine wave from $P_1$ to $P_2$ remains constant. The amplitude of the applied voltage is varied or modulated to form a pulse envelope along the peak modulated voltage amplitude. Preferably a voltage of from 10,000 to 75,000 volts is used. The preferred frequency of the alternating current used is from 35,000 to 200,000 cycles per second. The preferred pulse rate is generally in the range of from about 1 to 10,000 pulses per second, preferably about 100 to 1,000 per second.

FIGURE 4 is a circuit diagram of a circuit which will produce the pulsated alternating current. A source of voltage 40 of 500 volts or higher A.C. is coupled to a tuned inductance-capacitance circuit 41 which is in turn connected to anode 42 of triode 43 which also comprises cathode 44 and grid 45. Coil 46 of tuned circuit 41 forms together with coil 47 a pair of tuned coils which increase the voltage so that the voltage across the terminals of coil 47 is the magnitude required by the reaction cell of this invention. The high voltage load is for example the electrodes of the reaction cell described in FIGURE 1. Tickler coil 48 which is connected to grid 45 is also inductively coupled to coil 46. A grid leak circuit comprising resistor 49 and capacitor 50 connects grid 45 to ground through coil 48.

Considering now FIGURES 3 and 4 together, the cycle of operation of one pulse will be described. At $T_1$ (FIG. 3), no current is flowing through triode 43, as grid 45 is negatively charged (below the cut-off point for the tube). Then the negative charge on grid 45 is dissipated through grid leak circuit comprising inductance 48, resistance 49 and capacitor 50 to ground. Grid 45 becomes more positively charged and current flows through tube 43. The voltage across coil 46 and consequently across coils 47 and 48 increase and because of the grid feed back through coil 48, the grid becomes even more positively charged. This results in a rapid voltage buildup across coil 47. This takes place in the period from $T_1$ to $Ta$ in FIGURE 3. At point $Ta$, glow or arc discharge commences in the reaction cell and further rise in the voltage ceases because of the large amount of energy being removed from the high voltage coil 47. During the period from $Ta$ to $Tb$, a great portion of power of the entire circuit is fed to the reaction cell via the coupled resonating coil 46 and high voltage coil 47, and grid 45 becomes more negative because the grid is becoming negatively charged at a rate faster than the negative charge is dissipated through the grid leak circuit. At $Tb$, the grid 45 becomes so negative that current through the tube 43 is cut off. However, the arc discharge in the reaction cell continues for a period $Tb$ to $Tc$ while the voltage built up in coil 46 dissipates in the arc discharge. At $Tc$, the arc discharge abruptly terminates. When the arc discharge ceases, the voltage built up in coil 46 dissipates more slowly (period from $Tc$ to $T_2$). During the period $Tb$ to $T_2$, the negative charge on the grid 42 gradually dissipates through the grid leak circuit to ground and the grid becomes more positive establishing conditions for a fresh pulse.

The examples which follow will serve to illustrate some applications of the process of this invention.

EXAMPLE I

Using the apparatus shown in FIGURE 1, maintained at a temperature of 20° C., oxygen is passed through the chamber at the rate of .062 moles/hour. First an unpulsed alternating current having a frequency of 200,000 cycles per second is applied to the reaction cell to produce ozone which is collected and measured. It is found that 1.14 millimoles per hour of ozone are produced. Then, while maintaining the same conditions, the applied alternating current is pulsated at rates varying from 80 to 2880 pulses per second, the frequencies remaining constant. The yields of ozone increased with increasing pulse rates. Table I which follows summarizes the results.

*Table I*

| Pulses per second: | Millimoles of $O_3$ per hour |
|---|---|
| 0 | 1.14 |
| 80 | 1.26 |
| 720 | 2.19 |
| 1440 | 2.37 |
| 2880 | 2.55 |

EXAMPLE II

Using the apparatus shown in FIGURE 1 maintained at a temperature of 25° C., methane gas is passed through the chamber at varying rates. First an unpulsed alternating current having a frequency of 150,000 cycles per second is applied to the reaction cell and the percentage of methane reacted is determined for a given rate of passage of methane. Then the methane passing at the same rate is subjected to a pulsating alternating current of the same frequency but pulsating at the rate of 1500 cycles per second and the percentage of methane reacted is determined. This is repeated for a number of passage rates and in each case, the percent of methane reacted is found to be increased by the pulsated current. The results are listed in Table II. Among the reaction products of methane recovered are ethylene, propylene, butene, ethane, and propane which indicates that methane undergoes polymerization.

*Table II*

| Rate of Methane in moles/hour | Percent Methane Reacted unpulsed current | Percent Methane Reacted pulsed current |
|---|---|---|
| 0.240 | 6.4 | 8.3 |
| 0.067 | 19.2 | 36.2 |
| 0.032 | 34.3 | 60.7 |

EXAMPLE III

Using the apparatus shown in FIGURE 1 maintained at a temperature of 25° C., ammonia gas is passed through the cell at the rate of 0.675 mole per hour and is subjected to a pulsated alternating current having a frequency of 150,000 cycles per second and a pulse rate of 3000 pulses per second. Part of the ammonia decomposes. Among the reaction products are nitrogen, hydrogen and hydrazine.

EXAMPLE IV

Using the apparatus shown in FIGURE 5 maintained at a temperature of 25° C., a gaseous mixture of hydrogen and butane are reacted. The reaction cell of FIG. 5 comprises a capillary tube including chamber 50 enclosed by walls 51 preferably made of heat resistant glass. The electrodes comprise an uninsulated electrode 52 and coiled electrode 53 wound on the outside of walls. The reactants are passed through the cell. The butane which comprises 5% by weight of the mixture is passed through the cell at the rate of 0.027 mole of butane per hour. The reactants are subjected to a pulsated alternating discharge. Among the reaction products are ethylene, propylene and butene, methane, ethane and propane.

When the concentration of the butane is increased to an amount which varies with the nature of the reaction cell, said amount being 20% with the reaction cell of this invention, undesirable deposits of carbon being to appear in the reaction cell. When this occurs, hydrogen alone should be passed through the tube until the deposits disappear due to the reaction between the carbon and atomic hydrogen.

EXAMPLE V

Example IV is repeated using a gaseous mixture comprising 10% by weight of ethylene and the remainder hydrogen. The mixture is passed through the reaction cell at rates varying from 0.18 to 0.027 mole of ethylene per hour and subjected to a pulsated alternating discharge. Among the products are methane, ethane, propane, butane, propylene and butene.

EXAMPLE VI

Example III is repeated using a gaseous mixture comprising 50% by weight of methane and the remainder nitrogen. The mixture is passed through the reaction cell at the rate of 0.675 mole of methane per hour and subjected to a pulsated alternating current. Hydrogen cyanide and higher amines are the products of this reaction.

While there have been described what are at present considered to be the preferred embodiments of this invention, it will be obvious to those skilled in the art that various changes and modifications may be made therein without departing from the invention and it is therefore, aimed to cover all such changes and modifications as fall within the true spirit and scope of the invention.

What is claimed is:

1. An apparatus for conducting chemical reactions by means of pulsated alternating current electrical discharge comprising an elongated reaction zone open at both ends, said reaction zone varying in cross-section along its length with at least a portion of said cross-section being kidney-bean shaped; said reaction zone having a substantially non-conductive material as a housing therearound, said housing having an arcuate first electrode thereon on a face opposite to the face thereof which bounds said reaction zone, said housing having a second electrode on a face thereof opposite to the face thereof which bounds said reaction zone, said first and second electrodes being insulated from electrical contact therebetween and so positioned as to be substantially equidistant from each other over a substantial portion of the length of said reaction zone, said electrodes being connected to a source of said pulsated alternating current.

2. An apparatus as claimed in claim 1 wherein said second electrode is a wire which is located substantially at the locus of points equidistant from said first electrode.

3. An apparatus as claimed in claim 2 wherein said first electrode is a semi-cylindrical plate.

References Cited by the Examiner
UNITED STATES PATENTS

| | | | |
|---|---|---|---|
| 1,136,227 | 4/15 | Goldberg | 204—320 |
| 1,579,162 | 3/26 | Starke et al. | 204—321 X |
| 2,191,797 | 2/40 | Matheson | 204—168 |
| 2,541,697 | 2/51 | Glassbrook | 204—164 |
| 2,553,944 | 5/51 | Schlesman | 204—170 X |
| 2,615,841 | 10/52 | Thorp et al. | 204—176 |

FOREIGN PATENTS

| | | |
|---|---|---|
| 642,335 | 8/50 | Great Britain. |

WINSTON A. DOUGLAS, *Primary Examiner.*

JOSEPH REBOLD, JOHN H. MACK, *Examiners.*